United States Patent [19]
Pike et al.

[11] Patent Number: 5,948,874
[45] Date of Patent: Sep. 7, 1999

[54] ACID CATALYZED POLYMERIZATION

[75] Inventors: William C. Pike; Duane B. Priddy, both of Midland, Mich.

[73] Assignee: The Dow Chemical Company, Midland, Mich.

[21] Appl. No.: 09/065,974

[22] Filed: Apr. 24, 1998

Related U.S. Application Data

[60] Provisional application No. 60/050,829, Jun. 26, 1997.
[51] Int. Cl.$^6$ .................. C08F 220/06; C08F 220/10; C08F 2/02
[52] U.S. Cl. .................. 526/214; 526/86; 526/193; 526/204; 526/222; 526/224; 526/225; 526/232; 526/232.1; 526/232.3; 526/233; 526/234; 526/318.6; 526/329.2; 526/347
[58] Field of Search .................. 526/222, 224, 526/225, 233, 234, 318.6, 329.2, 86, 347, 193, 232, 232.1, 232.3, 204, 214

[56] References Cited

U.S. PATENT DOCUMENTS

| | | | |
|---|---|---|---|
| 5,115,055 | 5/1992 | Dais et al. | 526/225 |
| 5,145,924 | 9/1992 | Shero et al. | 526/225 |
| 5,254,650 | 10/1993 | Fukumura et al. | 526/329.2 X |
| 5,608,023 | 3/1997 | Odell et al. | 526/225 |

*Primary Examiner*—Fred Teskin

[57] ABSTRACT

The present invention is an improvement in a free radical bulk polymerization process for preparing a high molecular weight polymer from a vinyl aromatic monomer characterized in that the polymerization is conducted in the presence of an acid catalyst having a pKa at 25° C. of less than 2, or salt thereof, wherein the improvement comprises dispersing the acid catalyst, or salt thereof, in a (meth)acrylic acid or ester thereof, prior to contact with the vinyl aromatic monomer. The (meth)acrylic acid or ester allows the acid catalyst to be dispersed within the vinyl aromatic monomer without causing cationic polymerization. The acid catalyst, or salt thereof, catalyzes the free radical polymerization reaction such that high molecular weight polymers are produced in reasonable reaction times.

26 Claims, No Drawings

ACID CATALYZED POLYMERIZATION

CROSS REFERENCE STATEMENT

This application claims the benefit of U.S. Provisional Application No. 60/050,829, filed Jun. 26, 1997.

The present invention relates to an improved process for producing high molecular weight polymers from vinyl aromatic monomers.

BACKGROUND OF THE INVENTION

High molecular weight vinyl aromatic polymers, particularly polymers having weight average molecular weights (Mw) of greater than 300,000, have been typically produced by anionic polymerization rather than by free radical polymerization due to the slow polymerization rates used in free radical techniques to achieve high molecular weight polymers. However, anionic polymerization processes require expensive anionic initiators, such as organolithium compounds, and tend to produce discolored products due to the presence of residual lithium-containing salts.

High molecular weight vinyl aromatic polymers have also been produced by free radical polymerization in the presence of a soluble organic acid having pKa of 0.5 to 2.5, as in U.S. Pat. Nos. 5,145,924 and 5,115,055. However, in these processes the acid does not bind to the polymer and can migrate from the polymer during use, which can cause corrosion of mold surfaces. Additionally, such strong acids are difficult to disperse in vinyl aromatic monomers without initiating cationic polymerization and producing low molecular weight fractions.

Copending application 08/606,182 by Priddy, et al., discloses a process for preparing a high molecular weight polymer from a vinyl aromatic monomer using free radical polymerization, characterized in that the polymerization is conducted in the presence of a vinyl acid having a pKa at 25° C. from about 0.1 to about 2.0. The vinyl acid catalyzes the polymerization reaction such that high molecular weight polymers are produced in reasonable reaction times and the C—C double bonds of the vinyl acid react with the vinyl aromatic monomer such that the vinyl acid is not free to migrate from the polymer. However, such vinyl acids are also difficult to disperse in vinyl aromatic monomers.

Therefore, there remains a need for an acid catalyzed free radical polymerization process for producing high molecular weight polymers in reasonable reaction times from vinyl aromatic monomers using free radical polymerization without the disadvantages of the prior art.

SUMMARY OF THE INVENTION

The present invention is an improvement in a free radical bulk polymerization process for preparing a high molecular weight polymer from a vinyl aromatic monomer characterized in that the polymerization is conducted in the presence of an acid catalyst having a pKa at 25° C. of less than 2, or salt thereof, wherein the improvement comprises dispersing the acid catalyst or salt thereof, in a (meth)acrylic acid or ester thereof, prior to contact with the vinyl aromatic monomer. The (meth)acrylic acid or ester thereof allows the acid catalyst to be dispersed within the vinyl aromatic monomer without causing cationic polymerization. The acid catalyst or salt thereof catalyzes the free radical polymerization reaction such that high molecular weight polymers are produced in reasonable reaction times.

The high Mw polymer produced by the process of the present invention can be employed in applications where high molecular weight vinyl aromatic polymers are suitably used, such as foam sheet, films and injection molding processes. They can also be combined with polymers of differing Mw to make polymer compositions having a multimodal molecular weight distribution, preferably a bimodal molecular weight distribution, hereinafter referred to as bimodal compositions.

In another aspect of the present invention, a bimodal composition is produced containing a high molecular weight polymer from the first aspect of the present invention and a lower molecular weight polymer of a vinyl aromatic monomer.

DETAILED DESCRIPTION OF THE INVENTION

Vinyl aromatic monomers for use according to the present invention include, but are not limited to, those vinyl aromatic monomers previously known for use in polymerization processes, such as those exemplified in U.S. Pat. Nos. 4,666,987, 4,572,819 and 4,585,825. Preferably, the monomer is of the formula:

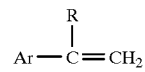

wherein R is hydrogen or methyl, Ar is phenyl, halophenyl, alkylphenyl or alkylhalophenyl, wherein any alkyl group contains 1 to 6 carbon atoms. The term halophenyl refers to a phenyl substituted with one or two halogen atoms, the term alkylphenyl refers to a phenyl substituted with one or two alkyl groups, and the term alkylhalophenyl refers to phenyl substituted with one or two alkyl groups which contain a halogen substituent or to a phenyl substituted with a halogen and an alkyl substituent. More preferably Ar is phenyl or alkylphenyl with phenyl being most preferred. In addition, the polymerization may be conducted in the presence of predissolved elastomer to prepare impact modified, or grafted rubber containing products, examples of which are described in U.S. Pat. Nos. 3,123,655, 3,346,520, 3,639,522, and 4,409,369.

The acid catalyst used in the process of the present invention may be any acid having a pKa at 25° C. of less than 2, or salt thereof. Accordingly, throughout the application, any teachings referring to the acid catalyst can also be applied to a salt thereof. The pKa is used to express the extent of dissociation of acids in water, and is the negative logarithm (to the base 10) of the equilibrium constant, Ka. Such acid catalysts include but are not limited to 2-sulfoethyl-methacrylate (SEM), acryloamidopropanesulfonic acid (AMPS), 2-sulfopropylmethacrylate, methane sulfonic acid, camphorsulfonic acid, p-toluenesulfonic acid, phosphoric acid, sulfuric acid, or mixtures thereof. Representative salts include 2-fluoro-1-methylpyridinium tosylate, SEM lithium salt, and 2 sulfoethyl-tetrabutyl ammonium salt. Preferably the acid catalyst is a vinyl functional sulfonic or vinyl functional phosphonic acid such as 2-sulfoethylmethacrylate (SEM), vinylphosphonic acid (VPA), 2-sulfopropylmethacrylate (SPM), styrenesulfonic acid (SSA), styrene-phosphonic acid (SPA), 4-vinylbenzylphoshonic acid (VBPA), 2-sulfoethylacrylate (SEA), α-phenylvinylphosphonic acid (PVPA), or mixtures thereof, with the most preferred vinyl acid being SEM. These acids are known and are commercially available or can be made by processes as described in U.S. Pat. No. 4,529,559 which is incorporated herein by reference.

The acid catalyst is dispersed in a (meth)acrylic acid or ester thereof, before combining with the vinyl aromatic monomer. The term (meth)acrylic acid refers to either a methacrylic acid or an acrylic acid. A (meth)acrylic acid ester would be any $C_1$–$C_8$ ester of methacrylic acid or acrylic acid. Accordingly, throughout the application, any teachings referring to (meth)acrylic acid can also be applied to an ester thereof. The (meth)acrylic acid acts as a reactive dispersant, copolymerizing into the vinyl aromatic polymer chain during polymerization such that it does not contaminate the polymer or the volatile recycle stream. The (meth) acrylic acid also serves as a buffer for very strong acid catalysts such that they can be added to styrene without initiating cationic polymerization. The acid catalyst generally comprises from 0.1 to 75 weight percent of the acid catalyst/(meth)acrylic acid mixture, typically from 0.5, preferably from 1, more preferably from 5, and most preferably from 10 to 75, typically to 70, preferably to 65, more preferably to 60, and most preferably to 50 weight percent of the acid catalyst/(meth)-acrylic acid mixture.

The amount of acid catalyst/(meth)acrylic acid mixture present in the polymerization is dependent upon the concentration of the acid catalyst in the mixture. Typically, the acid catalyst is present in the polymerization in amounts such that a high molecular weight polymer is produced without appreciably adversely affecting the properties of the polymer. The amount of acid catalyst needed will depend upon the particular acid catalyst used. It has been found that good results are obtained when the ratio (pKa X acid catalyst molecular weight)/(concentration of the acid catalyst in ppm based on vinyl aromatic monomer) is from 0.01, more preferably from 0.05, most preferably from 0.08, to 1, more preferably to 0.5, and most preferably to 0.3. In the case of acid salts, this would be based on the pKa of the acid component of the salt. In general, acid catalysts of higher pKa values will be present in greater amounts than acid catalysts of lower pKa values. Generally, the acid catalyst will be present in an amount of from 10, typically from 25, preferably from 30, more preferably from 40 and most preferably from 50 ppm to 1000, typically to 950, preferably to 900, more preferably to 850 and most preferably to 800 ppm, based on the amount of vinyl aromatic monomer. Sulfur containing vinyl acids can be used in amounts which will produce a high molecular weight polymer without initiating cationic polymerization. If the amount of sulfur containing vinyl acid is too great, the acid will initiate cationic polymerization which will produce low molecular weight polymers, e.g. less than 20,000 Mw. Cationic polymerization can therefore be detected by the formation of low molecular weight fractions within the high molecular weight polymer produced. Typically, amounts of from about 10 to about 500 ppm of a sulfur containing vinyl acid is present, preferably from about 15 to about 400, more preferably from about 20 to about 300, and most preferably from about 25 to about 200 ppm based on the amount of vinyl aromatic monomer. Phosphorus containing vinyl acids may be present in larger amounts and are not known to initiate cationic polymerization. Typically, amounts of from about 500 to about 20,000 ppm of phosphorus containing vinyl acid is present, preferably from about 600 to about 15,000, more preferably from about 800 to about 10,000 and most preferably from about 1000 to about 5000 ppm based on the amount of vinyl aromatic monomer.

The polymerization can optionally be conducted in the presence of a nitroxyl stable free radical compound as described in "Narrow Polydispersity Polystyrene by a Free-Radical Polymerization Process-Rate Enhancement", *Macromolecules* 1994, 27, pg. 7228–7229. Typical nitroxyl radical compounds include 2,2,6,6-tetramethyl-1-piperidinyloxy and 3-carboxy-2,2,5,5-tetramethyl-1-pyrrolidinyloxy. Typical amounts of nitroxyl stable free radical are from 10 ppm to 2000 ppm based on the amount of vinyl aromatic monomer.

An initiator may optionally be present in the free radical polymerization. Typical initiators include azo compounds and peroxides. Exemplary peroxides include tert-butylperoxybenzoate, tert-butylperoxyoctoate, di-tert-butylperoxide, dibenzoylperoxide, dilauroylperoxide, 1,1-bis-tert-butylperoxycyclohexane, 1,1,-bis-tert-butylperoxy-3,3,5-trimethylcyclohexane and dicumylperoxide.

The polymerization can be conducted at any temperature at which a high molecular weight polymer will be produced. Suitable polymerization temperatures are from about 80° C. to about 170° C., preferably from about 110° C. to about 160° C., with about 115° C. to about 150° C. being the most preferred.

The amount of time needed for the polymerization is dependent upon a number of factors including the acid concentration, the (optional) initiator concentration, the (optional) nitroxyl radical concentration, the percent conversion desired and the reaction temperature. Typically, the polymerization is conducted from 0.5 to 8 hours, preferably from 1 to 6 hours and most preferably from 1 to 5 hours.

The molecular weight of the resulting polymer is dependent upon a number of factors including the temperature, the (optional) initiator concentration, the (optional) nitroxyl radical concentration, the acid concentration and the time of reaction. The term molecular weight (Mw) refers to the weight average molecular weight as determined by gel permeation chromatography. The molecular weight of the high molecular weight polymer formed according to the process of the present invention is from 100,000 to 450,000, most preferably from about 350,000 to about 450,000. Polymers having molecular weights greater than 450,000 are undesirable because they are difficult to process.

The polymers produced by the first aspect of the present invention can also have the added advantage of a narrow polydispersity. Polydispersity refers to the ratio of the weight average molecular weight to the number average molecular weight. The high molecular weight polymers produced by the process of the present invention typically have polydispersity values of less than 2.5.

The high molecular weight polymers produced according to the process of the present invention may be blended with other ingredients, such as mold release additives, lubricants, colorants, ignition resistant additives, impact modifiers, glass fibers, and other polymers such as polyphenylene oxides, polycarbonates, elastomeric copolymers such as styrene-butadiene block copolymers, polybutadiene, etc., as well as other polyvinylaromatic resins.

The high molecular weight vinyl aromatic polymer produced according to the process of the present invention may be recovered by removing diluent and/or unreacted monomer from the reaction mixture resulting from the polymerization. Alternatively, the reaction mixture can be further processed to produce polymodal compositions containing polymers of differing molecular weight.

In one embodiment, bimodal compositions can be produced as described in U.S. Pat. No. 4,585,825 by Wesselmann, which is incorporated herein by reference. The bimodal composition is made by adding initiator to the high molecular weight polymer/unreacted monomer mixture, and polymerizing the unreacted monomer to produce a relatively low molecular weight vinyl aromatic polymer in the presence of the high molecular weight polymer.

The initiator may be any initiator or mixture of initiators which will polymerize the unreacted monomer in the mixture containing the high molecular weight polymer. The initiator can be any free radical initiator as discussed previously, and is preferably a peroxide initiator such as tert-butylperoxybenzoate, tert-butylperoxyacetate, di-tert-butylperoxide, dibenzoylperoxide, dilauroylperoxide, 1,1-bis-tert-butyl peroxycyclohexane, 1,1,-bis-tert-butylperoxy-3,3,5-trimethylcyclohexane and dicumylperoxide. Typical amounts of initiator are from 10 ppm to 2000 ppm based on the amount of vinyl aromatic monomer.

In another embodiment of preparing bimodal compositions, the initiator and acid catalyst/(meth)acrylic acid mixture can be added to the initial monomer feed prior to the production of high molecular weight polymer. In this process, the initiator is chosen such that lower molecular weight polymer is produced first. Upon depletion of the initiator, further polymerization yields a high molecular weight polymer. The initiator used in this embodiment preferably has a one hour half life temperature of less than 120° C. The one hour half life temperature is the temperature at which one half of the initiator is consumed after one hour of reaction time. Suitable initiators include benzoylperoxide, 1,1-bis(t-butylperoxy)cyclohexane, 2,2-bis-(4,4-di-[t-butylperoxy] cyclohexyl)propane, and t-butylperoxypivalate. Typical amounts of these initiators are from 10 ppm to 2000 ppm based on the amount of vinyl aromatic monomer.

Optionally, chain transfer agents may be utilized in the preparation of the lower molecular weight polymer. Suitable chain transfer agents include common chain transfer agents known in the art such as mercaptans. Preferably, the chain transfer agent is n-dodecylmercaptan or terpinoline. Typical amounts of chain transfer agents are from 10 ppm to 4000 ppm based on the amount of vinyl aromatic monomer.

The desired Mw of the high molecular weight polymer in polymodal compositions will be significantly higher than the desired Mw described in the first aspect of the present invention, since the high Mw polymer will be blended with a lower molecular weight polymer. In this aspect of the present invention the Mw can be selected according to the desired Mw of the polymodal composition and is preferably from about 300,000 to about 2,000,000 more preferably from about 350,000 to about 1,500,000, and most preferably from about 400,000 to about 800,000.

The desired Mw of the lower molecular weight polymer is also a matter of choice and is dependent upon the desired Mw of the bimodal composition and the desired properties. Preferably the Mw is from about 50,000 to about 200,000.

The amount of high molecular weight polymer present in the polymodal composition can be selected according to the desired properties of the polymodal composition. Typically, from 1 to 40 percent, preferably from 5 to 35 percent, and most preferably from 10 to 20 percent of the high molecular weight polymer is present.

The average Mw of polymodal compositions is dependent upon the Mw of the polymers contained within the composition. The average Mw of the bimodal composition of this embodiment of the present invention is preferably from about 120,000 to about 600,000, more preferably from about 130,000 to 500,000, and most preferably from about 140,000 to 400,000.

The composition containing both high and lower molecular weight vinyl aromatic polymers may be any combination of two vinyl aromatic polymers but is preferably a blend of polymers having the same composition (i.e., homopolymers of the same monomeric units or copolymers having the same comonomeric units in the similar ratios). More preferably, both polymers are polystyrene.

A preferred process for the production of the bimodal composition is a continuous polymerization process wherein a group of several distinct reaction zones within one or more reactors are used in series to create the different molecular weight polymers. The different zones are maintained at the desired temperatures and supplied with the appropriate reactants necessary to produce the desired amounts of polymer having the specified molecular weights, such that polymodal compositions are produced.

In a preferred process, wherein a high molecular weight polymer is produced first, an earlier polymerization zone is maintained such that a high molecular weight polymer is produced, while a later zone receives the reaction mixture from the previous zone, including the high molecular weight polymer. The later zone is optionally supplied with additional reactants, including an initiator and/or a chain transfer agent, and is otherwise maintained such that it produces a lower molecular weight polymer in the presence of the previously produced high molecular weight polymer, a blend of the two components being achieved thereby. Usually, the earlier high molecular weight polymer-producing reactor or zone is at a lower temperature than the subsequent lower molecular weight polymer producing reactor or zone.

In another preferred process, wherein the lower molecular weight polymer is produced first, an earlier zone is maintained such that lower molecular weight polymer is produced, while a later zone receives the reaction mixture from the previous zone including the lower molecular weight polymer. The later zone is maintained such that it produces high molecular weight polymer in the presence of the previously produced lower molecular weight polymer, a blend of the two components being achieved thereby. Both zones may be maintained at the same temperature or the later zone may be at a higher temperature than the previous zone.

Bimodal compositions containing high molecular weight and lower molecular weight polymers are useful for a variety of applications including foam board, foam sheet, injection molding, and extrusion. The following examples are provided to illustrate the present invention. The examples are not intended to limit the scope of the present invention and they should not be so interpreted. Amounts are in weight parts or weight percentages unless otherwise indicated.

EXAMPLES

The following mixtures are prepared:
Solution A
2.5% by weight concentrated sulfuric acid ($H_2SO_4$) dissolved in methacrylic acid.
Solution B
10% w/w ethylbenzene in styrene and 300 ppm of 1,1-bis (t-butylperoxy) cyclohexane.
Solution C
Ten grams of Solution B and 0.01 grams of pure methacrylic acid (MAA).
Solution D
Ten grams of Solution B and 0.01 grams of Solution A.

No color change or other evidence of polymerization are observed in solutions B, C or D. Two grams of Solutions B, C, and D are each loaded into glass ampoules. The ampoules are sealed under vacuum and placed in an oil bath heated at 110° C. The bath is heated to 175° C. over a four hour period and the ampoules are removed from the oil bath. The percent polystyrene in the solutions is determined by placing a portion of the polymer syrup in a vacuum oven for 10 minutes at 225° C. The molecular weight of the polystyrene produced is determined by analyzing a portion of the syrup from each ampoule using gel permeation chromatography. Solutions B and C are comparative and Solution D is an example of the invention.

| Solution | % Solids | Mw |
|---|---|---|
| B (No Catalyst) | 80 | 218 |
| C (MAA) | 81 | 217 |
| D (H$_2$SO$_4$ and MAA) | 74 | 290 |

The results show that MAA has no effect on styrene polymerization whereas sulfuric acid dispersed in MAA results in the formation of high molecular weight polystyrene.

What is claimed is:

1. In a free radical bulk polymerization process for producing high molecular weight polymers from a vinyl aromatic monomer characterized in that the polymerization is conducted in the presence of a acid catalyst having a pKa of less than 2 at 25° C., or a salt thereof, in a sufficient amount such that a high Mw polymer is produced without initiating cationic polymerization, an improvement wherein the acid catalyst is first dispersed in a (meth)acrylic acid or ester thereof, prior to contact with the vinyl aromatic monomer.

2. The process of claim 1 wherein the amount of acid catalyst or salt thereof is from 10 to 1000 ppm based on the amount of vinyl aromatic monomer.

3. The process of claim 2 wherein the acid catalyst or salt thereof is, 2-sulfopropylmethacrylate, methane sulfonic acid, camphorsulfonic acid, p-toluenesulfonic acid, 2-fluoro-1-methylpyridinium tosylate, vinylphosphonic acid (VPA), acrylamidopropanesulfonic acid (AMPS), styrenesulfonic acid (SSA), styrenephosphonic acid (SPA), 4-vinylbenzylphoshonic acid (VBPA), 2-sulfoethylacrylate (SEA), or α-phenylvinylphosphonic acid (PVPA).

4. The process of claim 3 wherein the acid catalyst is 2-sulfoethylmethacrylate.

5. The process of claim 4 wherein the 2-sulfoethylmethacrylate is first dispersed in methacrylic acid or methylmethacrylate.

6. The process of claim 4 wherein the 2-sulfoethylmethacrylate is first dispersed in acrylic acid or butylacrylate.

7. The process of claim 1 wherein the vinyl aromatic monomer is styrene.

8. The process of claim 1 wherein the acid catalyst is a vinyl acid.

9. The process of claim 1 wherein the polymerization is conducted in the presence of an initiator.

10. The process of claim 9 wherein the initiator is tert-butylperoxybenzoate, tert-butylperoxyoctoate, di-tert-butylperoxide, dibenzoylperoxide, dilauroylperoxide, 1,1-bis-tert-butylperoxycyclohexane, 1,1,-bis-tert-butylperoxy-3,3,5-trimethylcyclohexane or dicumylperoxide.

11. The process of claim 1 wherein the polymerization is conducted in the presence of a nitroxyl stable free radical.

12. The process of claim 11 wherein the stable free radical is 2,2,6,6-tetramethyl-1-piperidinyloxy or 3-carboxy-2,2,5,5-tetramethyl-1-pyrrolidinyloxy.

13. The process of claim 1 wherein a portion of the vinyl aromatic monomer has been polymerized in the presence of a free radical initiator such that a lower molecular weight polymer is produced prior to the production of high Mw polymer.

14. The process of claim 13 wherein the high molecular weight vinyl aromatic polymer and the lower molecular weight vinyl aromatic polymer are both polystyrene.

15. The process of claim 14 wherein the high molecular weight polystyrene has a Mw of about 350,000 to about 2,000,000 and the lower molecular weight polystyrene has a Mw of about 50,000 to about 200,000.

16. The process of claim 13 wherein the initiator is tert-butylperoxybenzoate, tert-butylperoxyoctoate, di-tert-butylperoxide, dibenzoylperoxide, dilauroylperoxide, 1,1-bis-tert-butylperoxycyclohexane, 1,1,-bis-tert-butylperoxy-3,3,5- trimethylcyclohexane or dicumylperoxide.

17. The process of claim 13 wherein the lower Mw polymer is produced in the presence of a chain transfer agent.

18. The process of claim 17 wherein the chain transfer agent in n-dodecylmercaptan.

19. The process of claim 13 wherein the composition of high molecular weight polymer and lower molecular weight polymer has combined average Mw of about 100,000 to about 600,000.

20. The process of claim 1 wherein the vinyl aromatic monomer is partially polymerized to produce a mixture of the high molecular weight polymer and unreacted monomer, a free radical initiator is added to said mixture and the unreacted vinyl aromatic monomer is polymerized under conditions such that a lower molecular weight polymer is produced.

21. The process of claim 20 wherein the high molecular weight vinyl aromatic polymer and the lower molecular weight vinyl aromatic polymer are both polystyrene.

22. The process of claim 21 wherein the high molecular weight polystyrene has a Mw of about 350,000 to about 2,000,000 and the lower molecular weight polystyrene has a Mw of about 50,000 to about 200,000.

23. The process of claim 20 wherein the initiator is tert-butylperoxybenzoate, tert-butylperoxyacetate, di-tert-butylperoxide, dibenzoylperoxide, dilauroylperoxide, 1,1-bis-tert-butylperoxycyclohexane, 1,1-bis-tert-butylperoxy-3,3,5-trimethylcyclohexane or dicumylperoxide.

24. The process of claim 20 wherein the lower Mw polymer is produced in the presence of a chain transfer agent.

25. The process of claim 24 wherein the chain transfer agent in n-dodecylmercaptan.

26. The process of claim 20 wherein the composition of high molecular weight vinyl aromatic polymer and lower molecular weight vinyl aromatic polymer has a Mw of about 100,000 to about 600,000.

* * * * *

UNITED STATES PATENT AND TRADEMARK OFFICE
CERTIFICATE OF CORRECTION

PATENT NO. : 5,948,874
DATED : September 7, 1999
INVENTOR(S) : William C. Pike, Duane B. Priddy Page 1 of 1

It is certified that error appears in the above-identified patent and that said Letters Patent is hereby corrected as shown below:

Claim 3,
Line 32, -- 2-sulfoethylmethacrylate (SEM) -- should be inserted after the term "2-sulfopropylmethacrylate".

Signed and Sealed this

Sixth Day of November, 2001

Attest:

*Nicholas P. Godici*

NICHOLAS P. GODICI
*Attesting Officer*    *Acting Director of the United States Patent and Trademark Office*